US010225368B2

(12) United States Patent
Candelore et al.

(10) Patent No.: US 10,225,368 B2
(45) Date of Patent: Mar. 5, 2019

(54) SYSTEM AND METHOD FOR DATA COMMUNICATION BASED ON CONTENT TYPE

(71) Applicant: SONY CORPORATION, Tokyo (JP)

(72) Inventors: Brant Candelore, San Diego, CA (US); Mahyar Nejat, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 241 days.

(21) Appl. No.: 15/058,087

(22) Filed: Mar. 1, 2016

(65) Prior Publication Data

US 2017/0257460 A1 Sep. 7, 2017

(51) Int. Cl.
*H04L 29/08* (2006.01)
*H04W 52/26* (2009.01)
*H04W 52/28* (2009.01)
*H04W 52/46* (2009.01)
(Continued)

(52) U.S. Cl.
CPC .......... *H04L 67/327* (2013.01); *H04L 67/322* (2013.01); *H04N 21/43615* (2013.01); *H04N 21/43637* (2013.01); *H04W 52/267* (2013.01); *H04W 52/281* (2013.01); *H04W 52/46* (2013.01); *H04W 52/283* (2013.01)

(58) Field of Classification Search
CPC ..... H04W 88/06; H04W 84/12; H04W 48/18; H04W 48/20; H04W 48/16
See application file for complete search history.

(56) References Cited

U.S. PATENT DOCUMENTS

| 8,295,224 B1* | 10/2012 | Deshong | H04L 65/1026 370/316 |
| 2004/0068588 A1* | 4/2004 | Kowalski | H04N 5/0736 709/248 |

(Continued)

FOREIGN PATENT DOCUMENTS

| CN | 101729380 A | 6/2010 |
| KR | 10-2014-039714 A | 4/2014 |

OTHER PUBLICATIONS

Vrushali. V. Kadu, "Manually Designed Wi-Fi Cantenna and Its Testing in Real-Time Environment", International Journal of Engineering Research and Development, E-ISSN: 2278-067X, P-ISSN: 2278-800X, www.ijerd.com, Aug. 2012, pp. 01-06, vol. 3, Issue 2.

(Continued)

*Primary Examiner* — Ranodhi Serrao
(74) *Attorney, Agent, or Firm* — Chip Law Group

(57) ABSTRACT

Various aspects of a system and method for data communication based on content type are disclosed herein. In accordance with an embodiment, the system includes a first electronic device, which is configured to determine content type of one or more data signals received from one or more data sources. The one or more data signals are associated with one or more carrier signals that correspond to a first signal strength parameter. A priority is set for each of the received one or more data signals, based on the determined content type. From the set priority and the determined content type, one of the received one or more data signals is communicated to a second electronic device at a second signal strength parameter, via the wireless carrier signal. The wireless carrier signal is associated with one of the received one or more data signals.

20 Claims, 6 Drawing Sheets

(51) Int. Cl.
H04N 21/436 (2011.01)
H04N 21/4363 (2011.01)

(56) References Cited

U.S. PATENT DOCUMENTS

| | | | | |
|---|---|---|---|---|
| 2005/0215284 A1* | 9/2005 | Su | ..................... | H04W 72/1215 |
| | | | | 455/556.2 |
| 2007/0206591 A1* | 9/2007 | Doviak | ............... | H04L 12/5692 |
| | | | | 370/389 |
| 2010/0056181 A1* | 3/2010 | Rippon | ................... | H04W 8/22 |
| | | | | 455/456.3 |
| 2016/0285570 A1* | 9/2016 | Cheng | .................. | H04B 17/318 |
| 2016/0345341 A1* | 11/2016 | Oliver | ................... | H04W 4/027 |

OTHER PUBLICATIONS

Jake Smith, "Next-Gen Apple TV Could Include Built-In TV Tuner, Wireless Router", Pocket-Lint Ltd, Jan. 28, 2014 Available at: http://www.pocket-lint.com/news/126874-next-gen-apple-tv-could-include-built-in-tv-tuner-wireless-router.

* cited by examiner

SYSTEM AND METHOD FOR DATA COMMUNICATION BASED ON CONTENT TYPE

CROSS-REFERENCE TO RELATED APPLICATIONS/INCORPORATED BY REFERENCE

None.

FIELD

Various embodiments of the disclosure relate to a system and method for data communication. More specifically, various embodiments of the disclosure relate to a system and method for data communication based on content type.

BACKGROUND

Advancements in the field of data communication have extended the functionalities of various communication systems, electronic devices, and associated applications. In certain scenarios, an electronic device may be required to access a content item from various remote data sources via a wireless communication channel. The quality of a wireless signal received at the electronic device may be too weak to support receipt of the content item, such as a media stream. For instance, the electronic device may be located at a distance from a wireless router in a home space that may dampen signal strength. The user experience of the play back, such as during media streaming, may be negatively impacted if the content item received via the wireless communication channel is dropped or delayed.

Wireless signal boosting may be performed to increase signal strength. Currently, such wireless signal boosting may be performed by a separate device, which may not recognize the type of content that is to be streamed. Thus, dependent on the content type, an advanced electronic device may be required to intelligently communicate data with signal strength boosting capability.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for data communication, based on content type is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
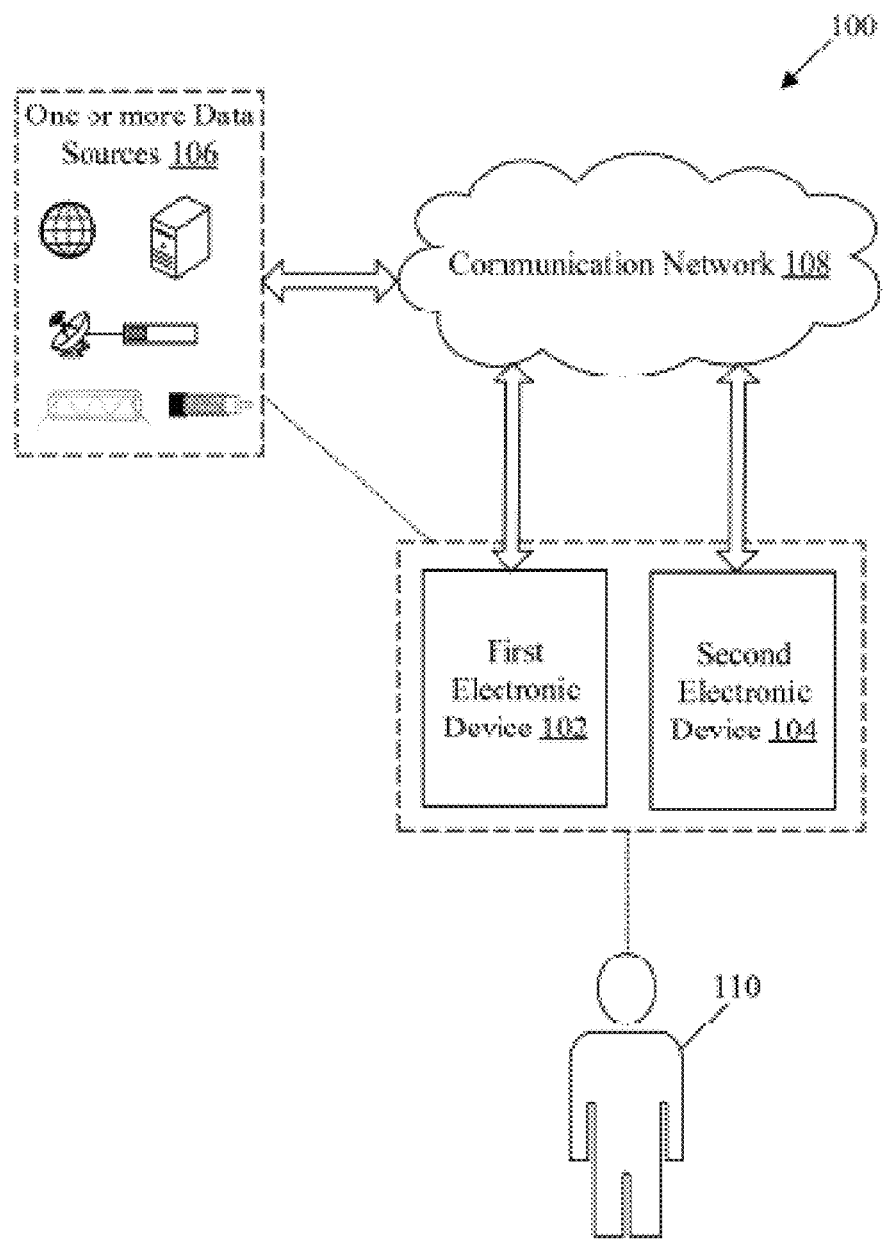
FIG. 1 is a block diagram that illustrates a network environment for data communication, in accordance with an embodiment of the disclosure.

The following described implementations may be found in the disclosed system and method for data communication based on content type. Exemplary aspects of the disclosure may include determination of content type of one or more data signals received from one or more data sources. The one or more data signals may be associated with one or more carrier signals that correspond to a first signal strength parameter. A priority may be set for each of the received one or more data signals, based on the determined content type. From the set priority and the determined content type, at least one of the received one or more data signals may be communicated to a second electronic device. One of the received one or more data signals may be communicated at a second signal strength parameter of a wireless carrier signal. The communication may occur via the wireless carrier signal at the second signal strength parameter. The wireless carrier signal may be associated with at least one of the received one or more data signals.

In accordance with an embodiment, the determined content type may correspond to a media stream, web content, an image, a text, and/or audio. The one or more data sources may correspond to a set-top box, a storage device, a Wi-Fi router, and/or a web server. In accordance with an embodiment, the first electronic device may correspond to a television (TV). The second electronic device may correspond to a smart phone, another TV, a tablet computing device, and/or other receiving device.

In accordance with an embodiment, the first electronic device may correspond to a smartphone. The second electronic device may correspond to a TV, another smartphone, a tablet computing device, and/or other receiving device. In accordance with an embodiment, content distribution and wireless routing for a plurality of other electronic devices, which includes the second electronic device, may be controlled by the first electronic device. The control of the content distribution and the wireless routing may be based on the set priority and the determined content type. The received one or more data signals may be rendered at the first or the second electronic device.

In accordance with an embodiment, a request from the second electronic device to communicate at least one of the received one or more data signals via a wireless communication channel, may be received by the first electronic device. The first electronic device may establish a communicative connection with the second electronic device via the wireless communication channel. The wireless communication channel may correspond to a wireless fidelity (Wi-Fi) network.

In accordance with an embodiment, the one or more carrier signals may correspond to one or more wired or wireless communication channels. Each carrier signal of the one or more carrier signals may be associated with a pre-determined signal-to-noise ratio. In accordance with an embodiment, the wireless carrier signal may correspond to a wireless communication channel. The wireless carrier signal at the second signal strength parameter may exhibit a higher signal-to-noise ratio (SNR) in comparison to other carrier signals of the one or more carrier signals.

In accordance with an embodiment, one or more data packets dropped during the communication of one of the received one or more data signals, via the wireless communication channel, may be detected by the first electronic device. The one or more dropped data packets may correspond to one or more data packets not received by the second electronic device.

In accordance with an embodiment, the first electronic device may re-communicate the one or more dropped data packets to the second electronic device. The second signal strength parameter of the wireless carrier signal, associated with at least one of the received one or more data signals, may be determined by the first electronic device. Such a determination may occur based on the priority and a distance of the second electronic device from the first electronic device.

In accordance with an embodiment, the second signal strength parameter of the wireless carrier signal may correspond to a preset second signal strength parameter of the wireless carrier signal, according to a pre-defined threshold. In accordance with an embodiment, the second signal strength parameter of the wireless carrier signal may correspond to a maximum signal strength parameter, in accordance with a pre-specified wireless routing capacity of the first electronic device.

FIG. 1 is a block diagram that illustrates a network environment, in accordance with an embodiment of the disclosure. With reference to FIG. 1, there is shown a network environment 100. The network environment 100 may include a plurality of electronic devices, such as a first electronic device 102, a second electronic device 104, one or more data sources 106, and a communication network 108, and one or more users, such as the user 110. In accordance with an embodiment, the first electronic device 102 may be communicatively coupled to the one or more data sources 106 and the second electronic device 104, via the communication network 108.

The plurality of electronic devices, such as the first electronic device 102 and the second electronic device 104, may comprise suitable logic, circuitry, interfaces, and/or code that may be configured to receive one or more data signals from the one or more data sources 106. Examples of the first electronic device 102 and the second electronic device 104, may include, but are not limited to, a television (TV), a smartphone, a tablet computing device, a smart watch, and/or other receiving device or consumer electronic device.

The one or more data sources 106 may comprise suitable logic, circuitry, interfaces, and/or code that may be configured to receive one or more requests from other devices to communicate one or more data signals. The one or more data sources 106 may further correspond to a home network that may comprise network of data storage and/or media devices in a home. Examples of the one or more data sources 106 may include, but are not limited to, a hard disk drive (HDD), a set top box (STB), USB Flash drive, and/or cloud-based resources. The cloud-based resources may comprise one or more servers that may provide image or video data to one or more subscribed electronic devices, such as the first electronic device 102 and/or the second electronic device 104. The cloud-based resources may be implemented by use of several technologies that are well known to those skilled in the art. The one or more servers from the plurality of cloud-based resources may be associated with a single or multiple service providers.

The communication network 108 may include a medium through which the first electronic device 102, the second electronic device 104, and/or the one or more data sources 106 may communicate with each other. The communication network 108 may be a wired or wireless communication network. Examples of the communication network 108 may include, but are not limited to, a Local Area Network (LAN), a Wireless Local Area Network (WLAN), a cloud network, a Long Term Evolution (LTE) network, a plain old telephone service (POTS), a Metropolitan Area Network (MAN), and/or the Internet. Various devices in the network environment 100 may be configured to connect to the communication network 108, in accordance with various wired and wireless communication protocols. Examples of such wired and wireless communication protocols may include, but are not limited to, IEEE 802.11, 802.16, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), Long Term Evolution (LTE), Light Fidelity (Li-Fi), and/or other cellular communication protocols or Bluetooth (BT) communication protocols.

In accordance with an embodiment, the first electronic device 102 may correspond to a television (TV). The second electronic device 104 may correspond to a smartphone, another TV, a tablet computing device, and/or other receiving device. In accordance with an embodiment, the plurality of electronic devices, such as the first electronic device 102 and the second electronic device 104, may be communicatively coupled to a communication network 108 (such as a home network). In accordance with an embodiment, the second electronic device 104 may establish a communicative coupling with the first electronic device 102, via a wireless communication channel, such as a Wi-Fi channel, in the communication network 108.

In operation, the second electronic device 104 may be configured to receive a user input, such as from the user 110, to access one or more content items from the one or more data sources 106. The one or more content items may be accessible via a wireless communication channel in the communication network 108, such as the home network. The first electronic device 102, such as the TV, may be configured to receive a request from the second electronic device 104, to communicate at least one of the one or more content items. The first electronic device 102, such as the TV, may function as a media controller and may have a signal strength boosting capability. In accordance with an embodiment, the first electronic device 102 may act a wireless router.

In accordance with an embodiment, based on the received request from the second electronic device 104, the first electronic device 102 may be configured to retrieve a requested content item from the one or more data sources 106. The requested one or more content items from the one or more data sources 106 may be retrieved via a wireless communication, such as Wi-Fi communication channel, in the communication network 108. In accordance with an embodiment, alternatively, the requested one or more content items from the one or more data sources 106 may be retrieved via wired communication. For example, the first electronic device 102 may be connected to the home network (such as the communication network 108) by use of wired communication medium, such as Ethernet or coaxial cable (Multimedia over Coax Alliance (MOCA)).

In accordance with an embodiment, the first electronic device 102 may be configured to receive one or more data signals from the one or more data sources 106. The one or more data signals may be associated with one or more carrier signals with corresponding first signal strength parameters. The one or more data signals may correspond to a plurality of content items that may include the requested one or more content items. The plurality of content items may be accessible by the first electronic device 102 from the one or more data sources 106. For instance, a content item, such as a video item, may be retrieved from the one or more data sources 106. The video item may be received at the first electronic device 102 in the first signal strength parameter, such as a weak Wi-Fi signal.

In accordance with an embodiment, the first electronic device 102 may be configured to determine the content type of the one or more data signals received from the one or more data sources 106. The determined content type may correspond to a media stream, web content, an image, a text, and/or an audio. The first electronic device 102 may be configured to set a priority for each of the received one or more data signals based on the determined content type.

Based on the set priority and the determined content type, the first electronic device 102 may be configured to communicate, at least one of the received one or more data signals to the second electronic device 104 at a second signal strength parameter. The second signal strength parameter of a wireless carrier signal may be associated with one of the received one or more data signals. One of the received one or more data signals may be communicated via the wireless carrier signal at the second signal strength parameter. In other words, the first electronic device 102 may boost and prioritize the signal when streaming content to other electronic devices, such as the second electronic device 104.

In accordance with an embodiment, the first electronic device 102 may be configured to control content distribution and wireless routing for a plurality of other electronic devices, such as the second electronic device 104. The content distribution and wireless routing may be intelligently controlled, based on the set priority and the determined content type. The received one or more data signals with the modified signal strength parameters may be rendered at the second electronic device 104. In other words, the first electronic device 102, such as the TV, may be used as a media controller to distribute (or "fling") content from the one or more data sources 106, such as a set-top box, a storage device, or a web server, to a media renderer, such as the second electronic device 104, or another TV. For instance, the first electronic device 102 may be the TV. In such a case, the TV may not only be a media controller but also a wireless router that may intelligently distribute content with boosted signal strength based on the determined content type.

In accordance with an embodiment, the communicated one of the received one or more data signals, via the second signal strength parameter, may be rendered at the first electronic device 102. In accordance with an embodiment, the media controller function may be in the second electronic device 104, such as a mobile device. The second electronic device 104 may also be a media renderer. Accordingly, the selected content item from the one or more data sources 106 may be played back at the second electronic device 104. In such an instance, the first electronic device 102, such as the TV, may be in a passive mode. A display screen of the first electronic device 102 may be "OFF" while the signal strength boosting function may be "ON".

In the passive mode, the second electronic device 104 may search for one or more network devices in a wireless network (such as the communication network 108) that is detected to be in a network discovery mode. The search may be performed to connect to an appropriate network device to retrieve the selected content item from the one or more data sources 106. The signal strength from the Wi-Fi signals available for the selected content item may be weak. The signal of the first electronic device 102 may be made stronger when the user selects a service set identifier (SSID) associated with the first electronic device 102, such as the TV, via the second electronic device 104. The selection of SSID may provide an indication to the first electronic device 102 to activate the signal strength boosting function on the first electronic device 102. When a content item or a data signal passes through the first electronic device 102, data packets for certain content types, such as the video item, may be prioritized. Further, the signal strength of a carrier signal that streams the data packets may be maximized in accordance with the pre-specified wireless routing capacity of the first electronic device 102. In other words, content items may be streamed to distantly located electronic devices in the intelligently boosted or maximized signal strength based on the determined content type and the set priority.

Figure 2:
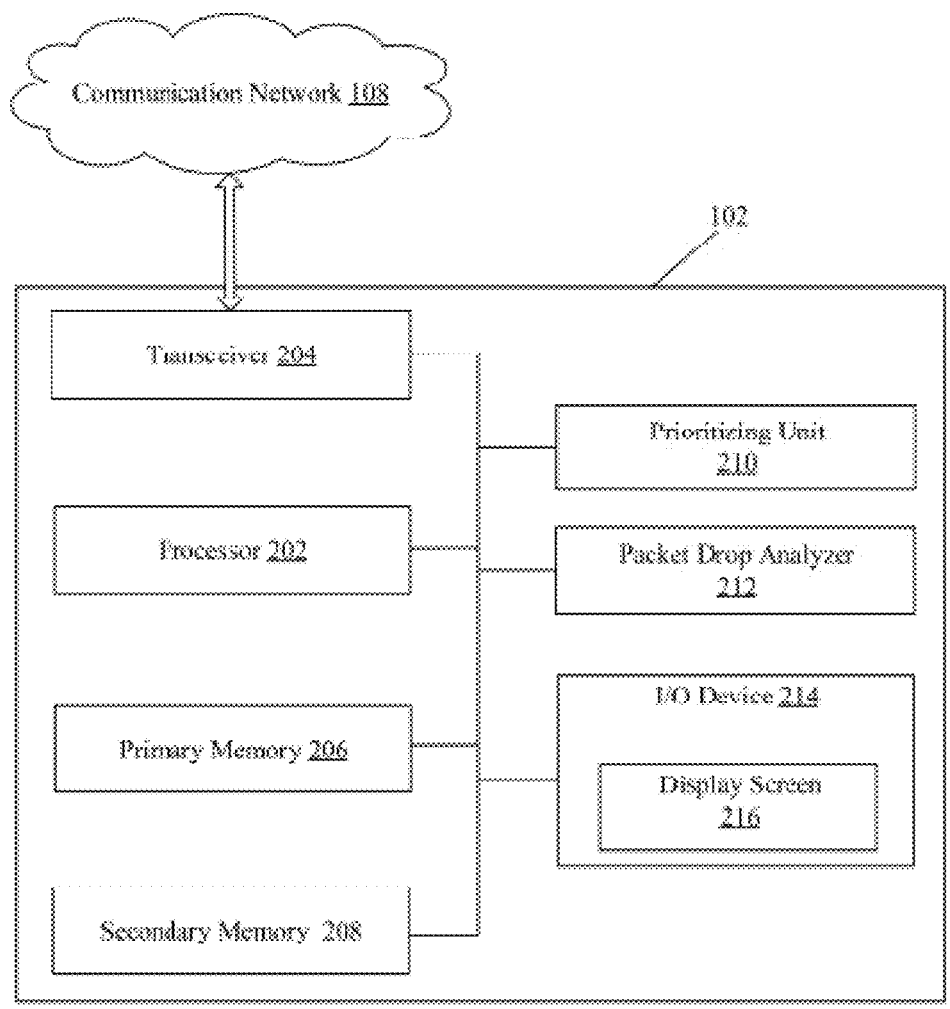
FIG. 2 is a block diagram that illustrates various components of an exemplary electronic device, in accordance with an embodiment of the disclosure.

FIG. 2 is a block diagram that illustrates various components of an exemplary electronic device, in accordance with an embodiment of the disclosure. FIG. 2 is explained in conjunction with elements from FIG. 1. With reference to FIG. 2, there is shown the first electronic device 102, which may include a processor 202, a transceiver 204, a primary memory 206, a secondary memory 208, and a prioritizing unit 210. The first electronic device 102 may further include a packet drop analyzer (PDA) 212, and/or an input/output (I/O) device 214. The I/O device 214 may further include a display screen 216. In accordance with an embodiment, the processor 202 may be communicatively coupled to the transceiver 204, the primary memory 206, the secondary memory 208, the prioritizing unit 210, the PDA 212, and/or the I/O device 214 of the first electronic device 102.

The processor 202 may comprise suitable logic, circuitry, interfaces, and/or code that may be configured to synchronize operations between various units, such as the prioritizing unit 210 and the PDA 212. The processor 202 may be further configured to determine content type of one or more data signals received via the transceiver 204. Examples of the processor 202 may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a digital signal processor (DSP), a graphics processor unit (GPU), a coprocessor, and/or other processors or integrated circuits.

The transceiver 204 may comprise suitable logic, circuitry, interfaces, and/or code that may be configured to transmit or receive one or more data signals under the control of the processor 202. The transceiver 204 may be implemented by technologies known in the art, to support a wired or a wireless communication of the first electronic device 102, with the communication network 108. Various components of the transceiver 204 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer. The transceiver 204 may communicate, via the wireless communication, with networks (such as the Internet)

and/or a wireless network (such as a Wi-Fi network, and/or a metropolitan area network (MAN)). The wireless communication may use any of a plurality of communication standards, protocols and technologies, such as Global System for Mobile Communications (GSM), Long term evolution (LTE), Enhanced Data GSM Environment (EDGE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The primary memory 206 may comprise suitable logic, circuitry, and/or interfaces that may be configured to temporally store support files associated with various operations performed by the processor 202. In accordance with an embodiment, the support files may correspond to system files, application files or data, browser files, or the like. Examples of implementation of the primary memory 206 may include, but are not limited to, Random Access Memory (RAM), Dynamic Random Access Memory (DRAM), Static Random Access Memory (SRAM), Thyristor Random Access Memory (T-RAM), Zero-Capacitor Random Access Memory (Z-RAM), Read Only Memory (ROM), Hard Disk Drive (HDD), and/or a Secure Digital (SD) card, and/or cache memory.

The secondary memory 208 may comprise suitable logic, circuitry, and/or interfaces that may be configured to store a machine code and/or a set of instructions executable by the processor 202. The secondary memory 208 may be further configured to store operating systems and associated applications. The secondary memory 208 may be configured to store the various derived information, such as information associated with the determined content type, dropped data packets, the priority of the one or more data signals, and/or signal strength parameters. The secondary memory 208 may be a non-transitory and/or non-volatile storage medium. Examples of implementation of the secondary memory 208 may include, but are not limited to, a Hard Disk Drive (HDD), an in-built storage medium, a storage server, a Secure Digital (SD) card, and/or a flash memory.

The prioritizing unit 210 may comprise suitable logic, circuit, interfaces, and/or code that may be configured to set a priority for each of received one or more data signals. In accordance with an embodiment, the prioritizing unit 210 may set a priority based on the content type of the one or more data signals.

The PDA 212 may comprise suitable logic, circuit, interfaces, and/or code that may be configured to detect one or more data packets dropped during communication of one or more data signals to the plurality of other electronic devices, such as the second electronic device 104. For instance, one or more data packets dropped during communication via a wireless communication between the first electronic device 102 and the second electronic device 104 may be detected. The one or more dropped data packets may correspond to one or more data packets not received by the second electronic device 104. The PDA 212 may be further configured to communicate a request to the processor 202. In accordance with an embodiment, the request may correspond to re-communication of the dropped data packets to the second electronic device 104.

The I/O device 214 may comprise suitable logic, circuitry, interfaces, and/or code that may be configured to receive an input from the user 110, or provide output to the user 110. The I/O device 214 may comprise various input and output devices that may be configured to communicate with the processor 202. Examples of the input devices may include, but are not limited to, a remote control, a touch screen, a keyboard, a mouse, a joystick, a microphone, a motion sensor, a light sensor, and/or a docking station. Examples of the output devices may include, but are not limited to, the display screen 216, a projector screen, and/or a speaker.

The display screen 216 may be configured to display content associated with the one or more data signals. In accordance with an embodiment, the display screen 216 may be a touch screen. The display screen 216 may be realized through several known technologies such as, but not limited to, Liquid Crystal Display (LCD) display, Light Emitting Diode (LED) display, plasma display, and/or Organic LED (OLED) display technology.

In operation, the processor 202 may receive a request for communication of one or more data signals from the second electronic device 104, via the transceiver 204. In accordance with an embodiment, the processor 202 may further communicate the received request to the one or more data sources 106, via the transceiver 204. The processor 202 may then receive (or retrieve) the one or more data signals from the one or more data sources 106, via the transceiver 204.

In accordance with an embodiment, the processor 202 may be configured to store one or more content items that correspond to the received one or more data signals in the secondary memory 208. In accordance with an embodiment, the one or content items that correspond to the received one or more data signals, may not be stored at the secondary memory 208. In such an embodiment, the processor 202 may be configured to temporally store the one or content items that correspond to the received one or more data signals, in the primary memory 206 for processing.

In accordance with an embodiment, the processor 202 may be configured to determine the content type of the one or more data signals received from the one or more data sources 106. The content type of each of the received one or more data signals may be determined based on one or more file identifying approaches, such as filename extension, internal metadata, and/or external metadata.

In accordance with an embodiment, the filename extension may correspond to .wma, .m4a, .mp4, .m4p, .jpg, .docx, .html, .mp3, and/or the like. The internal metadata may correspond to file header information, and/or the like. The external metadata may comprise operating system codes, such as type-codes, Uniform Type Identifiers (UTIs), extended attributes, PRONOM Unique Identifiers (PUIDs), MIME types, file format identifiers (FFIDs), file content based format identification, and/or the like. The processor 202 may be configured to store information associated with determined content type of each of the one or more received data signals in the secondary memory 208.

In accordance with an embodiment, the processor 202 may internally communicate each of the received one or more data signals to the prioritizing unit 210. The prioritizing unit 210 may be configured to read information associated with the determined content type from the secondary memory 208. The prioritizing unit 210 may be configured to set the priority for each of the received one or more data signals.

For example, the prioritizing unit 210 may set a first priority for a first data signal, such as an .mp4 file, of the received one or more data signals. The prioritizing unit 210 may set a second priority for a second data signal, such as an .html file (web content) of the received one or more data signals. The first priority of the first data signal may be higher than the second priority of the second data signal of the received one or more data signals. A specific content type, such as a video file or an audio file may be set to a higher priority in comparison to other content types, such as web content and/or a text file. The higher priority may indicate that such a data signal may need to communicate or stream without a drop in data packets as dropout in a video stream/audio stream may be unfavorable to a user, such as the user 110.

The prioritizing unit 210 may be configured to store information associated with the set priority of each of the received one or more data signals in the secondary memory 208. The one or more received data signals may be associated with one or more carrier signals that correspond to first signal strength parameters. The one or more carrier signals may correspond to one or more wired or wireless communication channels, such as Wi-Fi communication channel. Each carrier signal of the one or more carrier signals may be associated with a pre-determined signal-to-noise ratio.

The processor 202 may be configured to determine the first signal strength parameter of each of one or more carrier signals. The determined first signal strength parameter associated with a received data signal may indicate weak signal strength, such as a signal-to-noise ratio below a pre-determined threshold. The determined first signal strength may be a high signal strength. Based on the set priority and the determined content type, the first electronic device 102 may be configured to communicate at least one of the received one or more data signals to the second electronic device 104 at a second signal strength parameter of a wireless carrier signal. One of the received one or more data signals may be communicated via the wireless carrier signal at the second signal strength parameter. In other words, the first electronic device 102 may boost and prioritize the signal when streaming content with high priority to other electronic devices, such as the second electronic device 104.

In accordance with an embodiment, the second signal strength parameter may exhibit a higher signal-to-noise ratio than the first signal strength parameter. In accordance with an embodiment, both the first carrier signal and the second carrier signal of the one or more wireless carrier signals may be associated with a wireless communication channel. Each of the one or more wireless carrier signals may be associated with the one or more frequencies. In accordance with an embodiment, the first carrier signal may be associated with a first frequency. Similarly, the second carrier signal may be associated with a second frequency.

In accordance with an embodiment, a data signal set on a higher priority than other data signals of the received one or more data signals may be communicated via the second carrier signal at the second signal strength parameter (a boosted signal in the second frequency). For example, the wireless communication channel between the first electronic device 102 and the second electronic device 104 may be associated with a frequency band 2,483.5-2,500 megahertz (MHz). The first carrier signal associated with received data signal may be associated with the first frequency 2,490 MHz and first SNR 40 decibel (dB). The first electronic device 102 may have a capacity to communicate the received data signal along with second carrier signal, which may be associated with the second frequency 2,488 MHz and second SNR 60 dB. In such a case, the processor 202 may prioritize communication of the first data signal set on higher priority that other received data signals by the second carrier signal, via the transceiver 204. Similarly, the processor 202 may communicate a second data signal set on lower priority than other signals on the first carrier signal (without signal strength boosting), via the transceiver 204.

In accordance with an embodiment, the PDA 212 may be configured to detect one or more data packets dropped during the communication of at least one of the received one or more data signals, via the wireless communication channel. The one or more dropped data packets may correspond to one or more data packets not received by the second electronic device 104. The PDA 212 may be further configured to re-communicate the one or more dropped data packets to the second electronic device 104, via the transceiver 204.

In accordance with an embodiment, the processor 202 may be configured to determine the second signal strength parameter of the wireless carrier signal associated with at least one of the received one or more data signals. Such a determination may be based on the priority and a distance of the second electronic device 104 from the first electronic device 102. The second signal strength parameter of the wireless carrier signal may correspond to a preset second signal strength parameter of the wireless carrier signal, in accordance with a pre-defined threshold at the first electronic device 102. In accordance with an embodiment, the second signal strength parameter of the wireless carrier signal may correspond to a maximum signal strength parameter, in accordance with a pre-specified wireless routing capacity of the first electronic device 102.

Figure 3A:
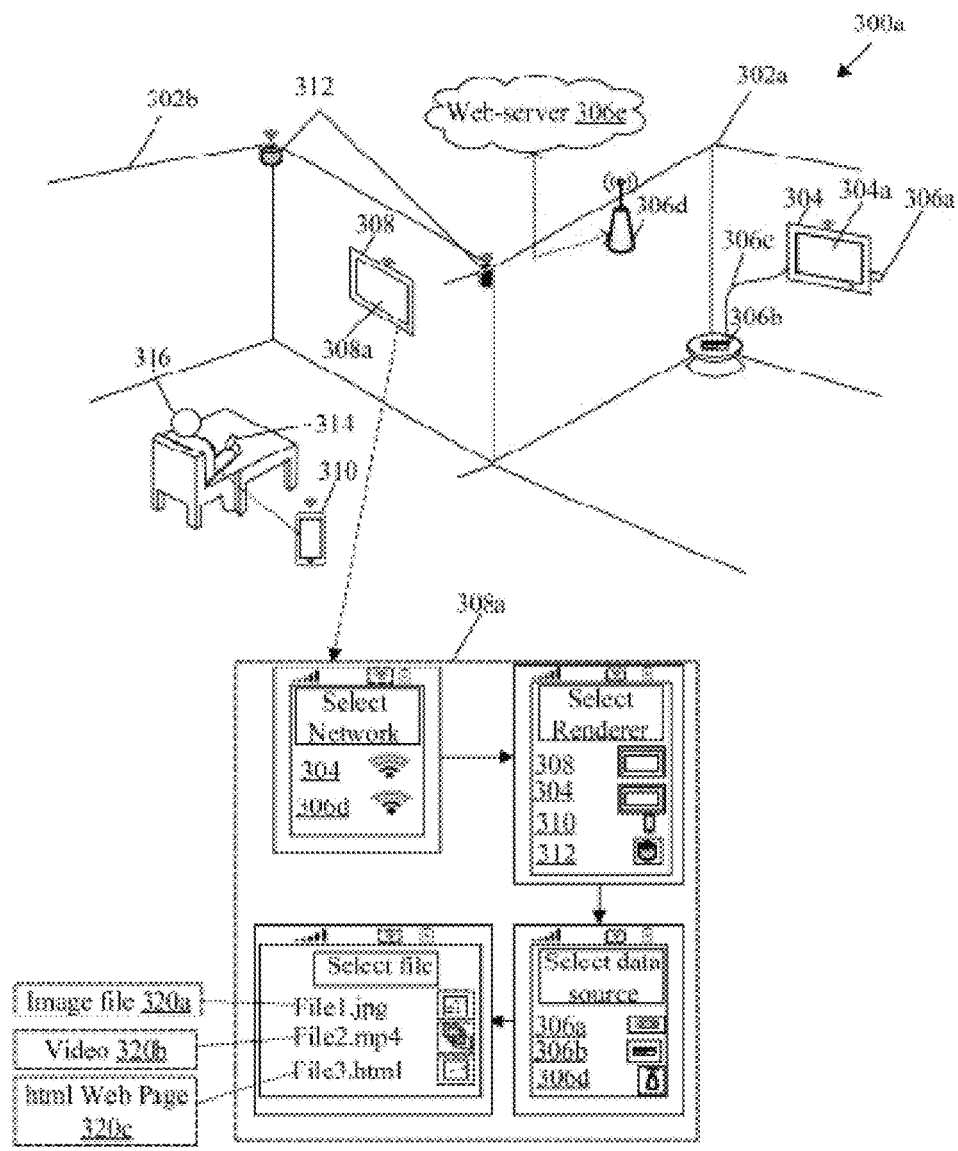
FIGS. 3A and 3B, collectively, illustrates a first exemplary scenario for implementation of the disclosed method and system for data communication, in accordance with an embodiment of the disclosure.
Figure 3B:
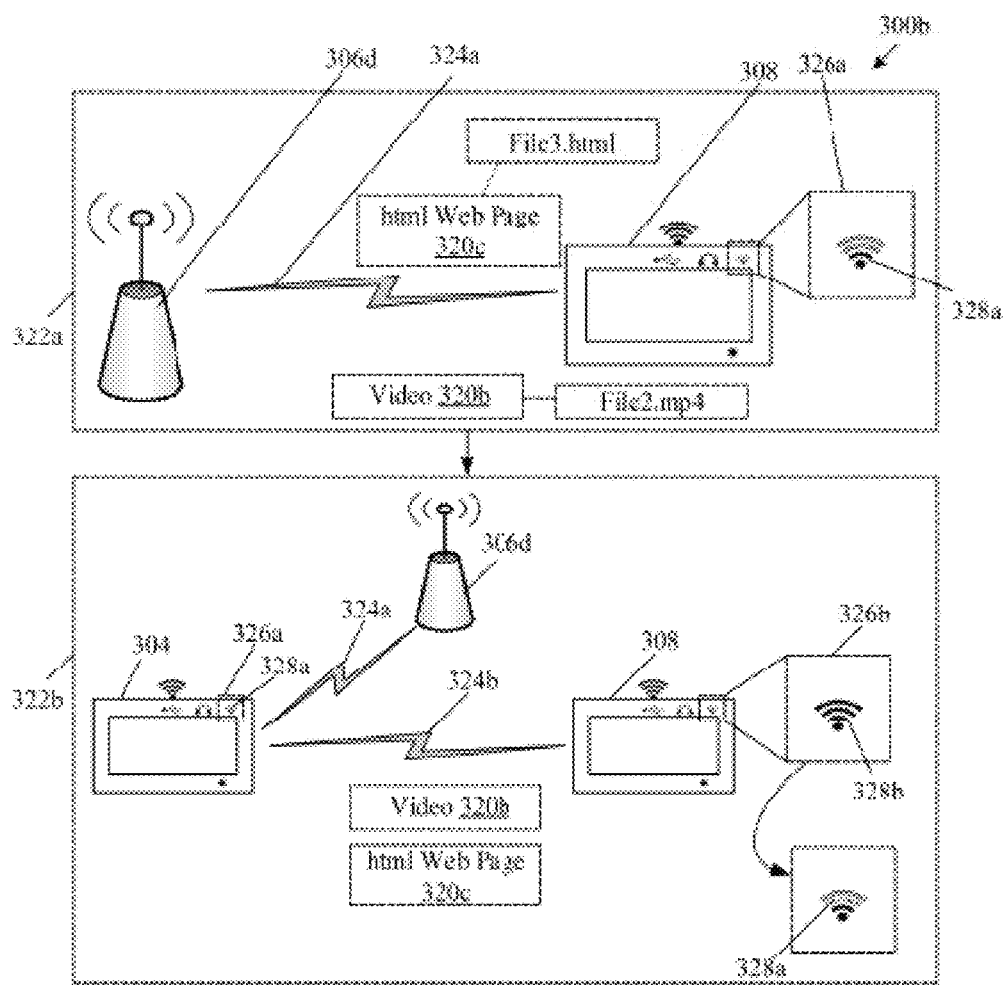

FIGS. 3A and 3B, collectively, illustrate a first exemplary scenario for implementation of the disclosed system and method for data communication, in accordance with an embodiment of the disclosure. FIGS. 3A and 3B are explained in conjunction with elements from the FIG. 1 and FIG. 2. With reference to FIG. 3A, there is shown an arrangement 300a to depict data communication among various electronic devices in a home network. The arrangement 300a may include a first room 302a, a second room 302b, a first television (TV) 304, and a plurality of data sources, such as a universal serial bus (USB) flash drive 306a, a set top box (STB) 306b, a coaxial cable 306c, a wireless router 306d, and a web server 306e. There is further shown a second TV 308, a smartphone 310, a set of speakers 312, a TV remote control 314, and a user 316 in the second room 302b. There is further shown a user interface (UI) 304a, associated with the first TV 304, and a UI 308a associated with the second TV 308.

In accordance with the first exemplary scenario, the first TV 304 may correspond to the first electronic device 102. The second TV 308 may correspond to the second electronic device 104. The plurality of data sources may correspond to the one or more data sources 106. The first TV 304 may include not only a media control but also an intelligent wireless routing function.

In accordance with an embodiment, the user 316 in the second room 302b may desire to access one or more content items from the plurality of data sources, such as the USB flash drive 306a, the STB 306b, or the web server 306e. In such a case, the functionality of the second TV 308 may correspond to a media renderer. The user 316 may use the TV remote control 314 to select various options rendered on the second TV 308, via the UI 308a. The second TV 308 may search for one or more network devices that are in a network discovery mode within the wireless home network. The search may be performed to connect to an appropriate network device to retrieve the selected content item from the one or more data sources 106. The quality of Wi-Fi signals received at the second TV 308 from the wireless router 306d and the first TV 304 may be weak, as shown by the arrow on the UI 308a.

The user 316 may select various options rendered at the UI 308a to access the desired content items. For example, the user 316 may select the Wi-Fi network from the wireless router 306d on the UI 308a, via the TV remote control 314. The user 316 may select one of the network devices from the list of searched network devices. Thereafter, the user 316 may select a renderer, such as second TV 308, from the list of renderers, as shown. Other renderers may be the set of speakers 312 and the smartphone 310, from the list of renderers. The user 316 may then select a data source from the plurality of data sources. For instance, the user 316 may access the web server 306e, via the wireless router 306d. The accessed or selected content items may be an image file 320a, a video 320b, or an html web page 320c. It is to be understood that the user 316 may select a desired content item from the connected other of the plurality data sources, as the USB flash drive 306a or the STB 306b. The signal strength from the available Wi-Fi signals available for the selected content item may be weak.

With reference to FIG. 3B, there is shown wireless routing based on content type in various instances, such as a first instance 322a and a second instance 322b. The sequence of operations in FIG. 3B is explained in continuation to the FIG. 3A.

In the first instance 322a, there is shown data communication between the wireless router 306d and the renderer, which is the second TV 308, via a first wireless communication channel 324a. There is also shown an enlarged view 326a of a first signal strength 328a of the first wireless communication channel 324a. In instances when the user 316 selects the Wi-Fi network of the wireless router 306d, via the TV remote control 314, the second TV 308 may be connected with the wireless router 306d, via the first wireless communication channel 324a. The second TV 308 may simultaneously receive the html web page 320c and the video 320b when data signals (data packets) associated with a wireless carrier signal are at the first signal strength 328a. The data signals and the wireless carrier signal may correspond to the first wireless communication channel 324a. There may be delay in streaming of the video 320b due to the first signal strength 328a. The first signal strength 328a may correspond to a weak signal.

In the second instance 322b, there is shown data communication between the first TV 304 and the renderer that is the second TV 308, via a second wireless communication channel 324b. The first TV 304 may include not only a media control but also an intelligent wireless routing and signal strength boosting function. There is also shown the enlarged view 326a of the first signal strength 328a of a wireless signal received from the wireless router 306d. There is also shown another enlarged view 326b of a second signal strength 328b of another wireless signal received from the first TV 304.

For instance, when the user 316 selects the Wi-Fi network of the first TV 304, a communicative coupling may be established by use of the SSID of the first TV 304. The first TV 304 may determine the content type of the html web page 320c and the video 320b selected to be communicated by the user 316. The first TV 304 may set a first priority (as shown below in Table 1) for the video 320b. In accordance with an embodiment, the first TV 304 may set a second priority (shown in table-1) for the html web page 320c. In accordance with an embodiment, a temporary priority list may be generated at the first TV 304 in run-time.

TABLE 1

An exemplary priority list

| Priority | File Name | File extension | Content type |
|---|---|---|---|
| 2 | File 1 | .html | Web content |
| 1 | File 2 | .mp4 | Video |

In accordance with an embodiment, when a content item or a data signal passes through the first TV 304, data packets for certain content type, such as the video item 320b, may be prioritized, over the html web page 320c. The first TV 304 may perform streaming of the video 320b to the second TV 308 at the second signal strength 328b, such as maximum signal strength of the first TV 304. Based on the determined content type and the set priority, certain content items, such as media content items, may be streamed to distant electronic devices, such as the second TV 308 in the second room 302b, with intelligently boosted signal strength. In other words, the first TV 304 may receive the video 320b in a weaker Wi-Fi signal, and then locally retransmit the video 320b on a different frequency which appears stronger to receivers, such as the second TV 308.

In accordance with an embodiment, the first TV 304 may connect to the home network by use of a wired communication medium, such as category 4 (Cat 4) cable (Ethernet), or a coaxial cable. In such an embodiment, the first TV 304 may receive the video 320b via the wired communication medium. Based on the determined content type and the set priority, the first TV 304 may then stream the content, such as the video 320b, via a wireless communication medium with intelligently boosted signal strength, as described above.

Figure 4:
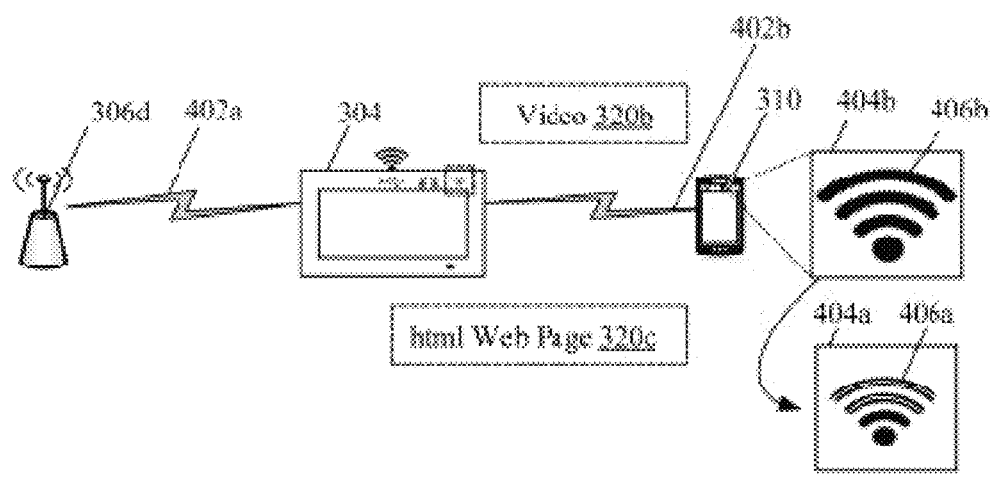
FIG. 4 illustrates a second exemplary scenario for implementation of the disclosed method and system for data communication, in accordance with an embodiment of the disclosure.

FIG. 4 illustrates a second exemplary scenario for implementation of the disclosed method and system for data communication, in accordance with an embodiment of the disclosure. FIG. 4 is explained in conjunction with elements from the FIGS. 1, 2, 3A, and 3B. With reference to FIG. 4, there is shown a first wireless communication channel 402a, between the wireless router 306d and the first TV 304. There is further shown a second wireless communication channel 402b, between the first TV 304 and the smartphone 310. There is further shown a first enlarged view 404a to depict a first signal strength 406a and a second enlarged view 404b to depict a second signal strength 406b of received signals. The sequence of operations in FIG. 4 is explained in continuation to and in conjunction with elements from FIG. 3A.

In accordance with the second exemplary scenario, the user 316 in the second room 302b (FIG. 3A) may desire access to one or more content items in the wireless home network from the plurality of data sources, such as the web server 306e. Instead of the first TV 304, the smartphone 310 may be the media controller and the media renderer. The user 316 may select various options rendered at a UI (not shown) at the smartphone 310 to access the desired content items. The user 316 may select the smartphone 310 as a renderer from the list of renderers similar to renderer selection as shown in FIG. 3A. Accordingly, a selected content item from the plurality of data sources may be played back at the smartphone 310. In such a scenario, the first TV 304 may be in a passive mode, where a display screen of the first TV 304 may be "OFF" while the signal strength boosting function may be "ON".

In accordance with an embodiment, the smartphone 310 may search for one or more network devices in the wireless home network that may be in a network discovery mode. The search may be performed to connect to an appropriate network device to retrieve the selected content item, such as the video 320b and the html web page 320c, from the plurality of data sources (such as the web server 306e), to be played back at the smartphone 310.

The selected content item may be available in weak Wi-Fi signals, such as received from the wireless router 306d and the first TV 304. In instances when the user 316 selects the Wi-Fi network of the first TV 304, via the smartphone 310, a communicative coupling may be established between the smartphone 310 and the first TV 304 (by use of the SSID of the first TV 304). When a content item or a data signal passes through the first TV 304, data packets for certain content types, such as the video 320b, may be prioritized.

The first TV 304 may retrieve the video 320b and the html web page 320c from the wireless router 306d, via the first wireless communication channel 402a in the first signal strength 406a. The first TV 304 may prioritize streaming of the video 320b over the html web page 320c to the smartphone 310 at the second signal strength 406b, such as maximum signal strength of the first TV 304. The smartphone 310 at the second room 302b, may receive the video 320b as data packets via the second wireless communication channel 402b at the second signal strength 406b without delay or drop in data packets.

The first TV 304 may then communicate the html web page 320c to the smartphone 310, at the first signal strength 406a, as the first signal strength 406a may be sufficient for receipt of the html web page 320c at the smartphone 310. In accordance with an embodiment, the first TV 304 may not boost the signal strength when the content to be streamed is the html web page 320c.

In accordance with an embodiment, the user 316 may select the first TV 304 as a renderer from the available list of renderers. The smartphone 318 may be the media controller. In such an embodiment, the first TV 304 may retrieve the video 320b and the html web page 320c from the wireless router 306d, via the first wireless communication channel 402a or the coaxial cable 306c. The first TV 304 may not boost the signal strength for other connected devices, such as the smartphone 310. In instances when the first TV 304 is selected as the renderer, the first TV 304 may prioritize its own data packets to be rendered on the first TV 304 over other data packets it may receive on the wireless home network.

Figure 5:
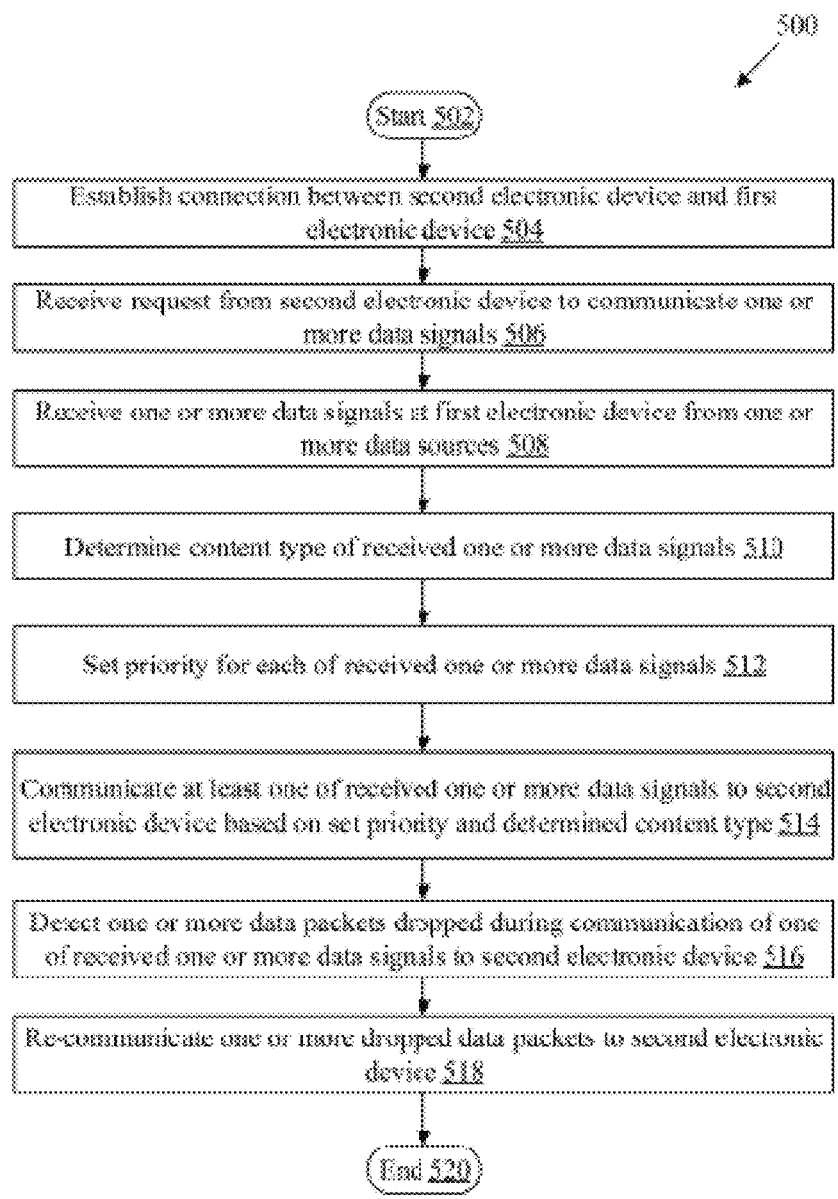
FIG. 5 depicts a flowchart that illustrates a method for data communication based on content type, in accordance with an embodiment of the disclosure.

FIG. 5 depicts a flowchart that illustrates a method for data communication based on content type, in accordance with an embodiment of the disclosure. With reference to FIG. 5, there is shown a flow chart 500. The flow chart 500 is described in conjunction with FIGS. 1, 2, 3A, 3B, 4 and 5. The method starts at step 502 and proceeds to step 504.

At step 504, a communicative connection may be established between the second electronic device 104 and the first electronic device 102, via a wireless communication channel, in a wireless network (such as Wi-Fi network). At step 508, a request may be received from the second electronic device 104 to communicate one or more data signals, via the wireless communication channel. The request may be received via the wireless communication channel by the first electronic device 102. The one or more data signals may correspond to one or more requested content items via the wireless communication channel.

At step 506, one or more data signals may be received at the first electronic device 102 from the one or more data sources 106. The one or more data signals may be associated with one or more carrier signals that correspond to first signal strength parameters. At step 510, the content type of the received one or more data signals may be determined by the first electronic device 102.

At step 512, a priority may be set for each of the received one or more data signals by the first electronic device 102, based on the determined content type. At step 514, based on the set priority and the determined content type, at least one of the received one or more data signals may be communicated to the second electronic device 104, via a wireless carrier signal at a second signal strength parameter of the wireless carrier signal. In accordance with an embodiment, based on the set priority and the determined content type, content distribution and wireless routing for a plurality of other electronic devices, which may include the second electronic device 104 may be controlled.

At step 516, one or more data packets dropped during the communication of the one or more data signals (such as the prioritized data signal) to the second electronic device 104, via a wireless communication channel, may be detected. The one or more dropped data packets may correspond to one or more data packets not received by the second electronic device 104. At step 518, the one or more dropped data packets may be re-communicated to the second electronic device 104, by the first electronic device 102. The control may pass to end step 520.

In accordance with an embodiment of the disclosure, a system for data communication, based on content type, may comprise the first electronic device 102 (FIG. 1). The first electronic device 102 may comprise one or more circuits, such as the processor 202, and/or the prioritizing unit 210 (FIG. 2). The processor 202 may be configured to determine content type of one or more data signals received from the one or more data sources 106 (FIG. 1). The one or more data signals may be associated with one or more carrier signals that correspond to first signal strength parameters. The prioritizing unit 210 may be further configured to set a priority for each of the received one or more data signals, based on the determined content type. The processor 202 may be configured to communicate at least one of the received one or more data signals to the second electronic device 104, at a second signal strength parameter of a wireless carrier signal. The communication may occur via the wireless carrier signal based on the set priority and the determined content type. The wireless carrier signal may be associated with at least one of the received one or more data signals.

Various embodiments of the disclosure may provide a non-transitory computer readable medium and/or storage medium, wherein there is stored thereon, a set of instructions executable by a machine and/or a computer to communicate data based on content type. The set of instructions may cause the machine and/or computer to perform the steps that include determination of content type of one or more data signals received from the one or more data sources 106. The one or more data signals may be associated with one or more carrier signals that correspond to first signal strength parameters. A priority may be set for each of the received one or more data signals based on the determined content type. Based on the set priority and the determined content type, at least one of the received one or more data signals may be communicated to the second electronic device 104. One of the received one or more data signals may be communicated at a second signal strength parameter of a wireless carrier signal. The communication may occur via the wireless carrier signal at the second signal strength parameter. The wireless carrier signal may be associated with at least one of the received one or more data signals.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims.

What is claimed is:

1. A system for data communication, said system comprising:
   circuitry in a first electronic device, wherein said circuitry is configured to:
      determine content type of a data signal received from a data source,
         wherein said data signal is associated with a carrier signal with a first signal strength parameter;
      set a priority for said received data signal based on said determined content type; and
      communicate, based on said set priority and said determined content type, said received data signal to a second electronic device,
         wherein said received data signal is communicated via a wireless carrier signal,
         wherein said wireless carrier signal corresponds to a second signal strength parameter different from said first signal strength parameter, and
         wherein said second signal strength parameter of said wireless carrier signal corresponds to one of a signal strength parameter of said wireless carrier signal set based on a threshold or a maximum signal strength parameter based on a wireless routing capacity of said first electronic device.

2. The system according to claim 1, wherein said determined content type corresponds to one of a media stream, web content, an image, a text, or an audio, and wherein said data source corresponds to one of a set-top box, a storage device, a Wi-Fi router, or a web server.

3. The system according to claim 1, wherein said first electronic device corresponds to a first television (TV) and said second electronic device corresponds to one of a smartphone, a second TV, a tablet computing device, or a receiving device.

4. The system according to claim 1, wherein said first electronic device corresponds to a first smartphone and said second electronic device corresponds to one of a television (TV), a second smartphone, a tablet computing device, or a receiving device.

5. The system according to claim 1, wherein said circuitry is further configured to control content distribution and wireless routing for a plurality of electronic devices,
   wherein said plurality of electronic devices includes said second electronic device,
   wherein said content distribution and wireless routing are controlled based on said set priority and said determined content type, and
   wherein said communicated data signal is rendered at said second electronic device.

6. The system according to claim 1, wherein said circuitry is further configured to control content distribution and wireless routing for a plurality of electronic devices,
   wherein said plurality of electronic devices includes said second electronic device,
   wherein said content distribution and wireless routing are controlled based on said set priority and said determined content type, and
   wherein said received data signal is rendered at said first electronic device.

7. The system according to claim 1, wherein said circuitry is further configured to receive a request from said second electronic device to communicate said received data signal via a wireless communication channel.

8. The system according to claim 7, wherein said circuitry is further configured to establish a communicative connection with said second electronic device via said wireless communication channel, and wherein said wireless communication channel corresponds to a Wi-Fi network.

9. The system according to claim 1, wherein said carrier signal corresponds to one of a wired communication channel or a wireless communication channel, and wherein said carrier signal is associated with a signal-to-noise ratio.

10. The system according to claim 1, wherein said wireless carrier signal corresponds to a wireless communication channel, and wherein said wireless carrier signal at said second signal strength parameter exhibits a higher signal-to-noise ratio in comparison to said carrier signal at said first signal strength parameter.

11. The system according to claim 1, wherein said circuitry is further configured to detect at least one packet dropped during said data communication of said received data signal via a wireless communication channel, wherein said at least one dropped data packet is undelivered to said second electronic device.

12. The system according to claim 11, wherein said circuitry is further configured to re-communicate said at least one dropped data packet to said second electronic device.

13. The system according to claim 1, wherein said circuitry is further configured to determine said second signal strength parameter of said wireless carrier signal associated with said received data signal, and wherein said second signal strength parameter is determined based on said set priority and a distance of said second electronic device from said first electronic device.

14. A method for data communication, said method comprising:

in a system for data communication:

determining, by circuitry in a first electronic device, content type of a data signal received from a data source,
wherein said data signal is associated with a carrier signal with a first signal strength parameter;

setting, by said circuitry, a priority for said received data signal based on said determined content type; and communicating, by said circuitry, said received data signal to a second electronic device based on said set priority and said determined content type,
wherein said received data signal is communicated via a wireless carrier signal,
wherein said wireless carrier signal corresponds to a second signal strength parameter different from said first signal strength parameter, and
wherein said second signal strength parameter of said wireless carrier signal corresponds to one of a signal strength parameter of said wireless carrier signal set based on a threshold or a maximum signal strength parameter based on a wireless routing capacity of said first electronic device.

15. The method according to claim 14, further comprising receiving, by said circuitry, a request from said second electronic device to communicate said received data signal via a wireless communication channel.

16. The method according to claim 14, further comprising establishing, by said circuitry, a communicative connection with said second electronic device via a wireless communication channel, wherein said wireless communication channel corresponds to a Wi-Fi network.

17. The method according to claim 14, wherein said wireless carrier signal corresponds to a wireless communication channel, and wherein said wireless carrier signal at said second signal strength parameter exhibits a higher signal-to-noise ratio in comparison to said carrier signal at said first signal strength parameter.

18. The method according to claim 17, further comprising detecting, by said circuitry, at least one data packet dropped during a communication of said received data signal via said wireless communication channel, wherein said at least one drooped data packet is undelivered to said second electronic device.

19. The method according to claim 18, further comprising re-communicating, by said circuitry, said at least one dropped data packet to said second electronic device.

20. The method according to claim 14, further comprising determining, by said circuitry, said second signal strength parameter of said wireless carrier signal associated with said received data signal, wherein said second signal strength parameter is determined based on said set priority and a distance of said second electronic device from said first electronic device.

* * * * *